United States Patent [19]

Guimbal

[11] Patent Number: 5,284,420
[45] Date of Patent: Feb. 8, 1994

[54] PLASTICS MULTI-BLADE VARIABLE-PITCH ROTOR

[75] Inventor: Bruno Guimbal, Les Milles, France

[73] Assignee: Aerospatiale Nationale Insustrielle, Paris, France

[21] Appl. No.: 960,906

[22] Filed: Oct. 14, 1992

[30] Foreign Application Priority Data

Oct. 16, 1991 [FR] France ................................ 9112731

[51] Int. Cl.[5] ............................................. B64C 27/48
[52] U.S. Cl. ................................. 416/134 A; 416/131; 416/230
[58] Field of Search ............... 416/131, 134 A, 134 R, 416/230

[56] References Cited

U.S. PATENT DOCUMENTS

| | | | |
|---|---|---|---|
| 3,669,566 | 6/1972 | Bourquardez et al. | 416/134 A |
| 3,762,834 | 10/1972 | Bourquardez et al. | 416/134 A |
| 3,765,267 | 10/1973 | Bourquardez et al. | 416/134 A |
| 3,950,115 | 4/1976 | Euler | 416/230 A |
| 4,281,966 | 8/1981 | Duret et al. | 416/134 A |
| 4,626,173 | 12/1986 | Mouille et al. | 416/134 A |
| 4,898,515 | 2/1990 | Beno et al. | 416/134 A |

FOREIGN PATENT DOCUMENTS 2041747 2/1971 France .
2125150 9/1972 France .

*Primary Examiner*—Richard A. Bertsch
*Assistant Examiner*—Michael S. Lee
*Attorney, Agent, or Firm*—Marshall, O'Toole, Gerstein, Murray & Borun

[57] ABSTRACT

A multi-blade rotor (1), especially for a helicopter rear anti-couple propeller, includes a hub body (3) to which are connected twistable straps (11 to 17) each formed by two bundles (20) of fibers with a flattened cross section arranged radially around the hub (3), each of the bundles (20) forming at least two halves of different blades (11 to 17) and being twisted and curved in the region of its passage near the center of the hub body (3) in such a way that it forms a tangent to the circumference of the center of the hub body (3) along the greater dimension of its cross section.

8 Claims, 4 Drawing Sheets

PLASTICS MULTI-BLADE VARIABLE-PITCH ROTOR

The present invention relates to a multi-blade, variable-pitch rotor, especially suitable for serving as a helicopter rear anti-couple rotor, when this rear rotor is of the shrouded type and usually comprises a large number of blades. It also relates to the method of obtaining such a rotor comprising a hub body.

BACKGROUND OF THE INVENTION AND PRIOR ART

In order to fix the variable-pitch blades onto the rotationally-driving hub body by means of a device offering suitable mechanical strength, particularly to counter the centrifugal tensile forces which are exerted on the blades due to their high speed of rotation, it is known to use twistable straps constituted by high-mechanical-strength fibers, said straps being arranged radially between the hub body and each blade and being rendered integral at their outer end, with respect to the axis of rotation of the rotor, with the strong structure of the blade and at their inner end with the hub body.

Thus, in the patent FR-A-2 430 354, is described a method for constituting a multi-blade propeller comprising at least one pair of opposed blades. This pair of opposed blades is constituted in essence by, on the one hand, a single elongated strap, made in high-mechanical-strength fibers agglomerated by a synthetic resin, said strap being fastened at its middle to a drive hub and, on the other hand, by two aerodynamically-profiled shells fixed respectively to said elongated strap on either side of the hub, the inner end with respect to the axis of rotation of the rotor of each shell being integral with a control member for the pitch of the corresponding blade, produced in such a way as to exert, on said shell, a torsion couple centered on the longitudinal axis of the elongated strap. This strap is formed by two flat half-bundles arranged side by side along the small dimension of their cross section and slightly spaced at their mid-length in such a way as to let the sliding shaft for control of the pitch of the blades pass through.

A propeller can thus be constituted by a plurality of such pairs of opposed blades, the respective strap forming the various twistable tie rods connecting said aerodynamically-profiled shells being superimposed in planes perpendicular to the axis of rotation of said rotor, in the area of their passage close to the control shaft and coated by a binder integrating the set of these straps together in this central area, where they thus constitute the hub body, which is integral with a drive shaft.

Moreover, there is known, by the patent FR-A-2 041 747 a link element, and its manufacturing method, between two rigid bodies, which comprises a bundle of high-mechanical-strength fibers arranged longitudinally in this element. Such a link element, flattened in shape, may constitute the retaining attachment for a rotor blade onto the hub body of said rotor, said bundle being twistable in such a way as to allow the controlled pitch variations of said blade. The strong armature of such a blade may then be constituted by extensions of such bundles into its aerodynamically-shaped part.

Such embodiments however comprise limitations. In the patent FR-A-2 430 354, the blades have to be opposed, thus imposing an even number of blades, which can be troublesome if, for acoustic reasons for example, it is suitable to install an odd number of them. Moreover, the straps are stacked in the hub body and there is thus no rotational symmetry, each strap turning in a plane which is peculiar to it, which dictates that a different torsion is provided for each strap so that the corresponding points on each strap can turn in a common plane. Moreover, the fact that each half-bundle partially surrounds the central bore of the hub body over half of its circumference, implies that these straps occupy a relatively large volume in the central area of the hub body. The half-bundles are then trapped in this area by the binder over a relatively great length and are thus unable to provide any torsional elasticity in this area, in particular for following the controlled pitch variations of the blades. It is then necessary to elongate the twistable part of the straps in order to obtain the torsional elasticity necessary for correct operation of the rotor up to its pitch limits.

In the embodiment described by the patent FR-A-2 041 747, it is possible to have an even or odd number of blades, but the total number of constituent bundles of said blades is limited due to the fact that these bundles of fibers are bent on the flat in the hub body, hence along the direction where they exhibit the greatest inertia, by an angle equal to that existing between two neighboring blades, which entails the existence of substantially different lengths between the fibers of the same bundle and, thus, poor distribution of the mechanical stresses between the fibers of this bundle.

SUMMARY OF THE INVENTION

The present invention aims to avoid these drawbacks and makes it possible to obtain a multi-blade rotor whose number of blades may be even or odd, whose central part forming a hub has a reduced bulk and whose blade retention strong and twistable elements are arranged in the hub in such a way as to best distribute the stresses between the working fibers of said blade retention elements.

To this end, the multi-blade rotor according to the invention, especially for a helicopter rear anti-couple propeller, comprising a hub body to which are radially connected twistable blade retention straps, equal in number to the number of blades, each formed by two bundles of high-mechanical-strength fibers agglomerated by a hardened synthetic resin, each of the said bundles having a flattened cross section and forming at least two halves of different straps, is noteworthy in that each of the bundles is twisted and curved in the region of its passage in proximity to the circular central area of the hub body in such a way as to be tangential to the circumference of the said central area of the hub along the greater dimension of its cross section.

Hence, a star-shaped rotor can be constituted by an even or odd number of blades, while not imposing significant torsion stresses on the blade retention bundles for fixing them onto the hub when there is a large number of blades.

Moreover, each bundle of a strap can pass, in the region of the hub, above another, first bundle and below another, second bundle.

The various straps of the rotor are thus interleaved and their corresponding points are arranged in the same rotational plane about the shaft of the rotor, which avoids different torsion being given to each of the straps in order to bring their corresponding points into the same rotational plane.

In particular, said other first and second bundles above and below which a bundle passes may belong to the same strap.

It is thus possible to carry out crossing in the region of the base of a strap and thus produce interleaving between bundles from neighboring straps.

One advantage exhibited by such a rotor is that the cross sections of the various bundles can be orientated along the same angle with respect to the rotational plane of the straps about the shaft of the rotor.

Hence it is possible to preform the straps in order to give them the angular pitch preset which is best adapted to the rotor, in particular in order to reduce the torsion imposed on the straps in order to apply the maximum pitch anticipated for the blades. The angular preset of the straps can be given by grooves produced in the peripheral part of the hub body.

Moreover, the two bundles of fibers each constituting a strap can be placed side by side along the smaller dimension of their cross section in such a way as to offer the smaller resistant couple opposing their torsion.

At least one strap of the rotor may advantageously constitute a spar for the aerodynamically-shaped part of the associated blade.

Thus there is available a strap and a blade all in one piece, and it is possible to produce, by application to all the straps, a rotor constituted by a part all in one piece, which simplifies assembly and diminishes the cost thereof.

It is also possible for at least one of said straps of the rotor to comprise, at its end, a loop permitting a blade to be connected thereto.

This makes it possible to easily change a blade which has been damaged in use, without having to change the whole of the rotor.

In order to produce said rotor, according to the invention, a method of manufacturing a multi-blade rotor, especially for a helicopter rear anti-couple propeller, by means of a mold formed by two half-molds, said rotor comprising a central cylindrical block forming a hub to which are connected twistable straps each formed by two bundles of fibers with a flattened cross section, each of said bundles forming two halves of different straps, is noteworthy in that it comprises the following steps:

at the center of the first half-mold is placed said cylindrical block comprising a central cylindrical axial collar and radial passages for the different bundles, the middle of a first bundle of fibers is made to be tangential to the outer cylindrical wall of said collar, the bundle being impregnated with polymerizable resin, twisted and curved in the area where the tangency is produced, and each half of said first bundle is arranged respectively, according to the length of the volume reserved, in this first half-mold, for a first pair of straps, while giving, by twisting and curving in the vicinity of the cylindrical block, the required orientation for the cross section of each of said straps of said first pair of straps of which this first bundle constitutes half;

the preceding step is repeated, by using a second bundle of fibers impregnated with polymerizable resin, relative to a second pair of straps, this second bundle passing above the first bundle placed during the preceding step;

in a series of successive steps, the preceding step is repeated with, respectively, third and subsequent bundles of fibers impregnated with polymerizable resin, relating respectively to third and subsequent pairs of straps, until formation of the second half of the last strap remaining to be completed, by the half of the last bundle passing, in the region of the cylindrical block, under another bundle;

the free volumes are filled with polymerizable resin and the second half-mold is put in place; and polymerization of said resin then takes place.

It is thus possible to obtain a rotor with an even or odd number of straps, each of them being subjected only to a limited mechanical stress in twisting and bending for its connection to the central hub, while having good torsional elasticity due to the fact that it is embedded over a short length near the center of the rotor.

These bundles may also be better integrated with this cylindrical block.

In this method of manufacturing a multi-blade rotor, it is moreover possible, before polymerization of the resin, to place a cover having substantially the same diameter as said cylindrical block on the assembly of components previously installed in said first mold.

This cover thus encloses the twisted and curved parts of the bundles and holds them in place.

Said cylindrical block may be constituted by a rigid material constituted by mechanically-strong fibers coated with a polymerizable product.

The block thus does not need to be machined in a hard material, and can simply be molded. Moreover, it is therefore of light weight.

DESCRIPTION OF THE DRAWINGS

The figures of the attached drawing will make it easy to understand how the invention can be embodied. In these figures, identical references designate similar elements.

DESCRIPTION OF THE PREFERRED EMBODIMENTS

Figure 1:
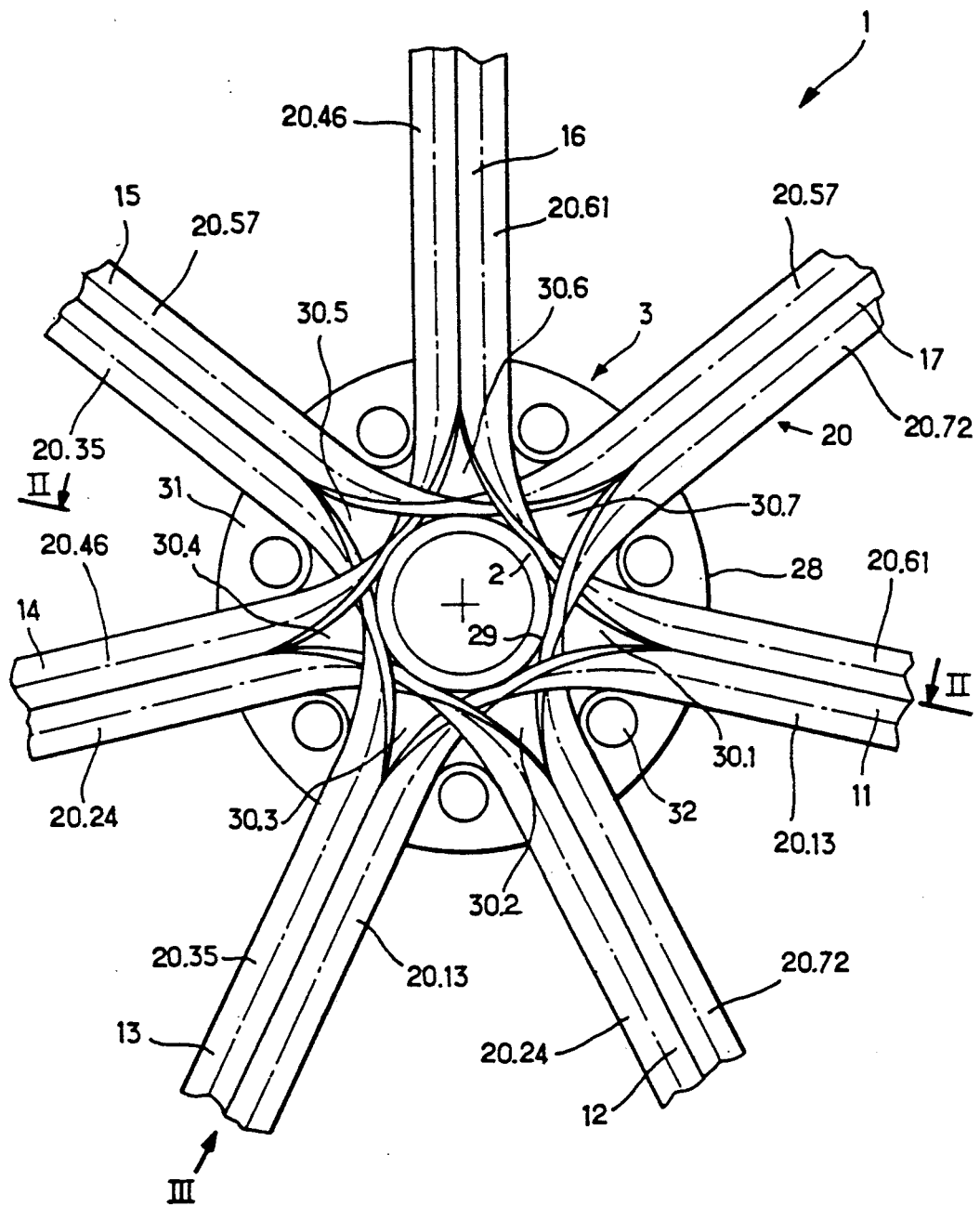
FIG. 1 shows in detail the arrangement of the straps of the rotor of the invention, according to an exemplary embodiment of a seven-strap rotor.

The star-shaped rotor 1, shown in FIG. 1, comprises a central collar 2 centered on the axis of rotation of the rotor (assumed to be perpendicular to the plane of said figure) and integral with the hub 3 to which is connected a set of seven straps 11 to 17, whose corresponding points are situated in the same plane in which they are intended to rotate, a plane perpendicular to the axis of said rotor 1. Each strap 11 to 17 is formed by a first half strap and by a second half strap, juxtaposed along their length, in the form of a pair of bundles belonging to a set of seven identical bundles 20 of high-mechanical-strength fibers, arranged longitudinally to the strap 11 to 17 in question, which provides the latter with great rigidity in traction, as well as good torsional elasticity. Each bundle 20 serves to form two half straps belonging to different straps 11 to 17; it has a cross section of flattened shape, substantially rectangular, and the two bundles 20 forming the same strap such as 11 are, in this example, placed side by side along the smaller dimension of their cross section, which gives a flattened shape to the cross section of each branch 11 to 17.

Figure 2:
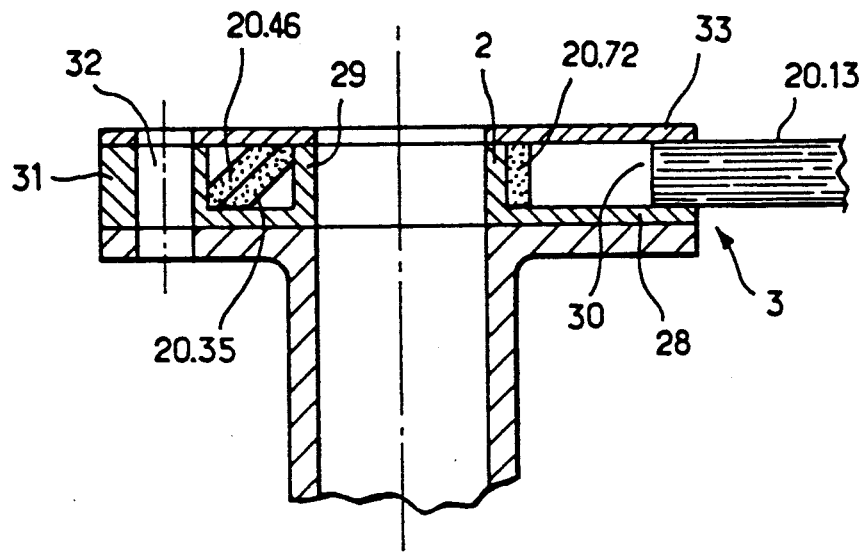
FIG. 2 is sectional view, along the line II—II of FIG. 1, showing the orientation of the cross section of the straps of the star shape thus constituted.

The way in which the various bundles 20 are mutually arranged is shown in FIGS. 1 and 2. The hub body 3 is constituted by a cylindrical block 28, of limited thickness, comprising a central hole bordered by the annular collar 2, as well as a set of seven machined radial grooves 30 opening out into a clearance produced around the collar 2. These grooves are regularly spaced in angle and are composed of a first 30.1 to a seventh 30.7 groove respectively aligned with the first strap 11 to the seventh strap 17, each intended to provide for the passage of the two bundles 20 forming the strap 11 to 17 in question. The cross section of these grooves 30 corresponds to the twisted and curved shapes of the bundles 20 as defined below. The presence of these grooves 30 and of the central clearance means that the cylindrical block 28 is reduced, over part of its thickness, on the one hand to the central annular collar 2 and, on the other hand, by the material 31 remaining in the peripheral part of the cylindrical block 28. Hence there is created a hollow annular volume around the cylindrical outer wall 29 of the annular collar 2 where the bundles 20 can pass and there change direction, access to this annular volume being in the region of the grooves 30.

A first bundle 20.13 is arranged, at midlength, tangentially to the wall 29 of the collar 2, as detailed below, and it forms, by one of its halves, the first half of the strap 11, while its second half forms the second half of the strap 13. The greater dimension of the cross section of this first bundle 20.13 constituting the straps 11 and 13 is arranged substantially in a plane parallel to the axis of the rotor and this first bundle 20.13 is twisted, substantially by a quarter turn, and slightly curved in the region of its passage in the first groove 30.1 situated opposite the first strap 11, which permits said first bundle 20.13 to have a contact surface which is substantially parallel to the periphery 29 of said annular collar 2. The twisting of the first bundle 20.13 carries on in the same direction, by about a further quarter turn, as does the curving, in order to form said second half of the third strap 13, by passing through the central annular clearance. The shape of the cross section of the grooves 30 and of the annular clearance is adapted to permit the passage of bundles such as the first twisted and curved bundle 20.13, which allows the latter to be at a tangent to the cylindrical outer wall 29 along the greater dimension of its cross section. This routing of the bundles also makes it possible to obtain great resistance to being torn out by a centrifugal force, since each bundle 20 is not shearing the synthetic coating material which is added later in order to provide overall coherence.

The first bundle 20.13 passes from the first strap 11 to the third strap 13 without undergoing significant flexing which would induce different elongations in the various fibers of this first bundle 20.13, since the twisting and the curving of a flattened section takes place practically without rotational displacements of the fibers which constitute it. Moreover, as this first bundle 20.13 is tangential to the annular collar 2 only over a limited part of its periphery, less than half of the circumference, the volume occupied by this first bundle 20.13 in the central annular volume is limited, which implies that it is possible to have a relatively large number of bundles 20 passing through, with a constant central annular volume occupied. The various bundles 20 are, after all are put in place, integrated, for example, by a synthetic material providing bonding of the various elements.

A second bundle 20.24 serves to constitute the first half of the second strap 12 and the second half of the fourth strap 14. It will be understood that the relative arrangement of this second bundle 20.24 is the same as that of the first bundle, to within a rotation of 1/7 of a turn about the axis of the rotor. This second bundle 20.24 passes above the first bundle 20.13 in proximity to its area of tangency with the outer cylindrical wall 29 of the annular collar 2.

A third 20.35, a fourth 20.46, a fifth 20.57 and a sixth 20.61 bundle are successively put in place. A seventh bundle 20.72 is, similarly, put in place, with the difference that it passes under the first bundle 20.13, and not above. A regular interleaving is thus constituted, each bundle 20 occupying the same axial position and the corresponding points of the various bundles 20 therefore being in the same rotational plane as the others.

Holes 32, arranged on the periphery of the cylindrical block 28, in the areas 31 between the grooves 30, serve for the passage of screws serving to couple this cylindrical block 28 with a view to driving it by a shaft with its axis coincident with that of the rotor.

As set out in the example above, all the bundles 20 have the same shape, and are imbricated in the same way, which provides a rotational symmetry for the assembly. All the straps 11 to 17 have, due to this fact, a similar relative position, which ensures that their corresponding points are in the same rotational plane and, in particular, that the blades which are linked to them turn in the same rotational plane.

This example is only one among several possible configurations.

In particular, it is possible to have an interleaving pitch other than two, as in the preceding example, that is to say that a bundle 20 starting from a strap 11 of rank "i" may end up at a strap 11 to 17 of rank other than "i+2", and therefore possibly pass through several apertures limited by the external diameter of the central cylindrical collar 2 and of other bundles 20. Similarly, the interleaving pitch may be 1, which is a particular case for which the bundles 20 do not cross over.

The practical procedures for putting various bundles 20 successively in place may also be modified; it is, in particular, not obligatory to successively form the first half of contiguous straps.

The number of straps such as 11 may also be even.

Moreover, it is not obligatory that the twisting be done in the same direction for all the bundles 20, or that the routing in the annular volume surrounding the cylindrical collar 2 be strictly the same, since the passage of the bundles through the grooves hold the bundles 20 in the same plane in order to form the straps 11 to 17.

Neither is the relative arrangement of the cross section of the two bundles 20 forming a strap 11 limited to the example described, and, in particular, for certain applications, these two bundles 20 may be superimposed.

Neither is the choice of the number of bundles 20 forming a strap such as 11 of the rotor restricted to the FIG. 2, but can be any whole number greater or equal to 1.

Neither is it obligatory for the relationship between the number of straps such as 11 and the interleaving pitch to be such that there is continuity in the formation of all the straps such as 11. It is, in fact, possible for the star shape formed by the straps 11 to 17 to be constituted by the imbrication of several elementary star shapes, each constituted by a limited number of bundles 20, said bundles 20 of one elementary star shape being, however, imbricated with the totality of the bundles 20.

Figure 3:
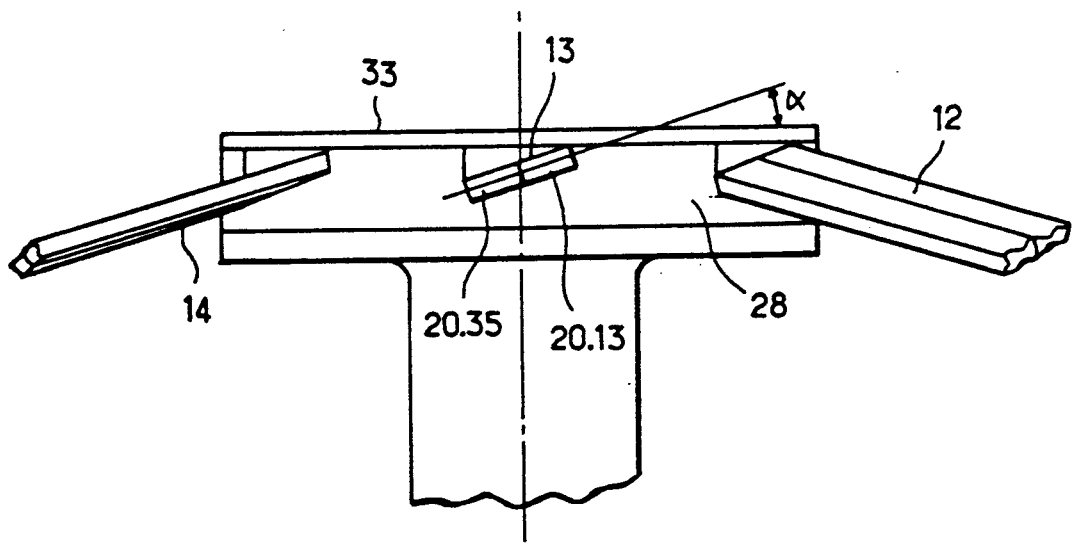
FIG. 3 is a side view of the rotor of FIG. 1, along the arrow III.

The orientation of the cross section of each bundle 20, on the side away from the center of the rotor 1, may not be in the plane of the straps, but may form a certain angle with this plane, as FIG. 3 shows. This orientation is defined by said twisting in the region of the cylindrical block 28, and it exhibits, above all, a usefulness when said rotor 1 serves to form a complete propeller whose pitch ranges are not symmetric about zero pitch. Hence, FIG. 3 shows that the cross section of the straps such as 12 is not oriented in the plane of rotation of the rotor 1, but forms an angle of about 10 to 15 degrees. Such an angle corresponds to a mean pitch angle for a helicopter rear rotor 1, and it is thus possible to control the dynamic variation of this angle by a supplementary twisting control, by means of a known mechanical device. The permanent twisting may be obtained by a twisting solely in the region of the grooves 30, in this case, their shape is modified as a consequence; this modification may also aid the interlaced passing of the bundles 20.

The different bundles 20 having thus been put in their relative places, they are then covered with a cylindrical cover 33, substantially of the same diameter as the cylindrical block 28, and, preferably, constituted by the same material. This cylindrical block 28 and this cover 33 are constituted, for example, by a stacking of circular layers of glass or carbon fiber or, generally, of mechanically-strong fibers coated with a binder, such as a synthetic resin, this stacking being hot-polymerized under pressure. For their part, the fibers of the bundles 20 are coated with synthetic resin. In order to integrate the set of the components of the rotor 1 and give the final shape, a mold is used, formed by a first and by a second similar half-mold each having a shape corresponding to the core of the hub 3 and to the straps 11 to 17, and the rotor 1 is obtained as a result of the following steps;

preferably, the cylindrical block 28 is machined in advance, in such a way that the annular ring 2 remains, having the same axis as said cylindrical block 28 and the areas 31 separating the grooves 30, regularly distributed in angle and each allowing for the passage of two twisted bundles 20 coming tangential to the outer wall 29 of the collar 2 along the greater dimension of the cross section of a bundle 20;

said cylindrical block 28 is placed at the center of said half first-mold, aligning it on the axis of symmetry of said half-mold and the middle of the first bundle 20.13, twisted and curved in the area where the tangency is produced, is made to be tangential to it, the bundle passing into the first groove 30.1 and the third groove 30.3, and each half of said first bundle 30.13 is arranged respectively, along the length of the reserved volume, in the first half-mold, for the first 11 and third 13 straps respectively associated with said first 30.1 and third 30.3 grooves, while giving, by twisting in the region of the cylindrical block 28, the desired orientation for the cross section of each of the first 11 and third 13 straps of which this first bundle 20.13 constitutes half;

the preceding step is repeated, by using a second bundle 20.24 in place of the first bundle 20.13, relative to the pair of the second 12 and fourth 14 straps of respective following ranks, this second bundle 20.24 passing above the third groove 30.3 partially occupied by the first bundle 20.13 placed during the preceding step;

in a series of successive steps, the preceding step is repeated with third 20.35, fourth 20.46, fifth 20.57, sixth 20.61 and seventh 20.72 bundles, relative respectively to the pairs of straps 13 and 15, 14 and 16, 15 and 17, 16 and 11, and 17 and 12 of respective following ranks, until formation of the second half of the second strap 12 by the half of the seventh bundle 20.72 passing, in the region of the cylindrical block 28, under the first bundle 20.13.

Next, the cover 33 of diameter substantially equal to that of the cylindrical block 28 and, preferably, formed by the same materials is placed over the assembly of the components previously installed in this first half-mold.

Then the free volumes are filled with adhesive and the second half-mold is put in place.

These various elements are next integrated by virtue of the fact that the mold is placed in an oven in order to polymerize the resin and harden the adhesive.

After removal from the mold and cooling, the holes 32 are bored for bolts 32A serving to integrate the hub body 3 onto the drive shaft, and the central hole is drilled to its final diameter.

Figure 4:
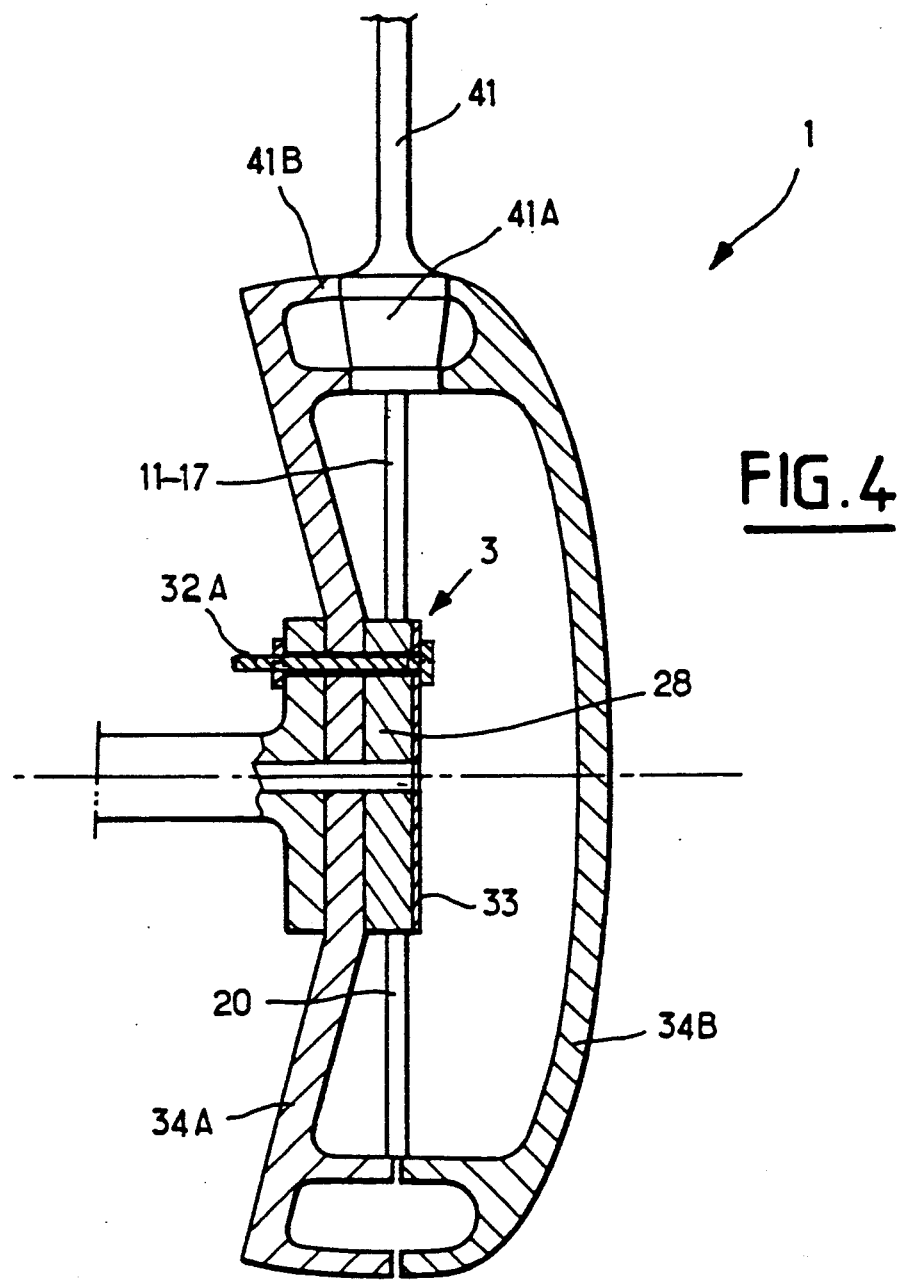
FIG. 4 is a sectional view along the axis of the rotor.

The assembly is next mounted into the hub 34, represented in FIG. 4, which is a cross section along the axis of the central hole; this hub 34 is constituted by two flanges 34A and 34B of the same diameter, covering over the cylindrical block 28 and the start of the straps 11 to 17. This hub 34 traps the straps 11 to 17 and forms a bearing serving for support of the blade roots; thus, when this rotor 1 is in rotation, these straps 11 to 17 are not subjected to any flexing stress.

Figure 5:
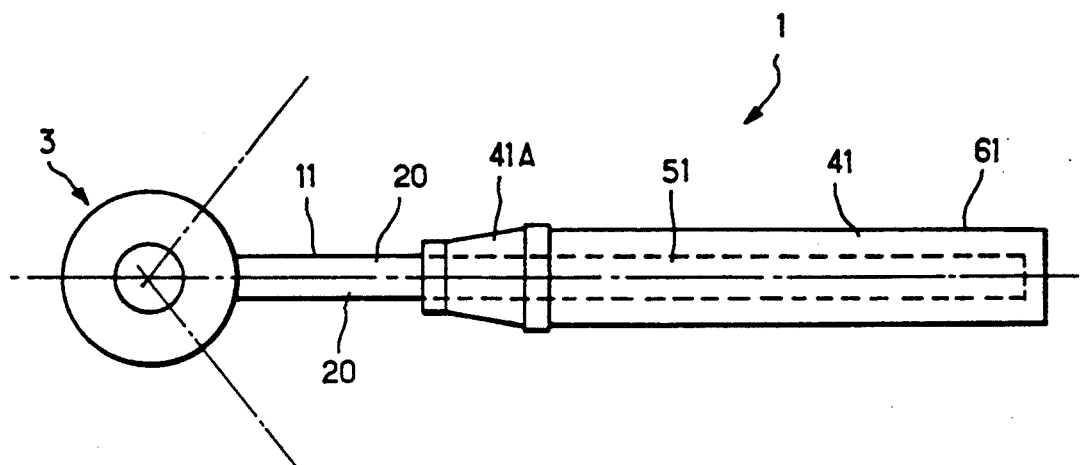
FIG. 5 shows the configuration of a strap of the rotor according to the invention, being extended into the blade in order to serve as a spar.

The straps 11 to 17 of such a rotor 1 can be extended by blades 41, whose blade roots 41A are mounted rotatably into bearings 41B of the hub 34 (see FIG. 4). Hence, the pitch of said blades 41 may be controlled in a known way by a lever actuated by a control device which is not represented. In the embodiment of FIG. 5, the two bundles 20 of a strap such as 11 are extended, starting from the center of the rotor 1, in order to form the star 51 of the blade 41, that is to say that they constitute the strong part of this blade 41, which is constituted, moreover, by a filling product, such as a cellular or foam adhesive synthetic material, between said bundle 20 and a shell 61 having the aerodynamic shape required for said blade 41.

Figure 6:
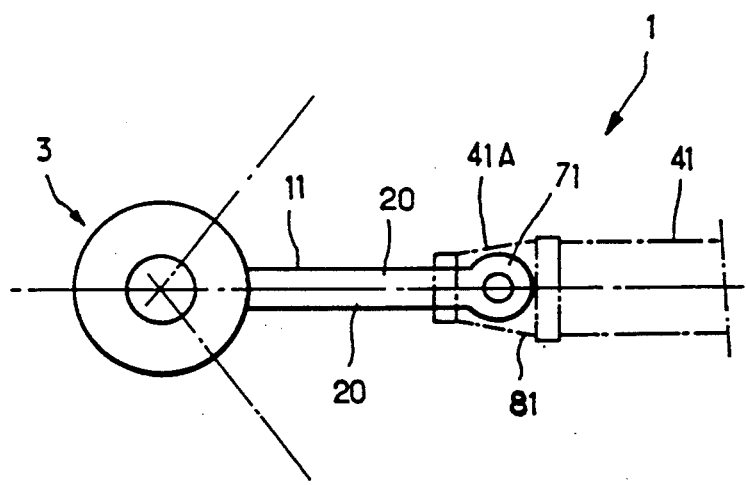
FIG. 6 shows a configuration similar to that of FIG. 5, the strap being adapted at its free end to accommodate a detachable link with a blade.

Another embodiment of this rotor 1 is represented in FIG. 6. The structure is the same as that set out with respect to FIG. 4, but the bundles 20 of each strap such as 11 are not extended to form the spar 51 of the corresponding blade 41; they are terminated respectively by a loop such as the loop 71 on which a root 81 of the blade 41 can be connected, by insertion of a bolt. Hence, each strap such as 11 is constituted by a same bundle 20, which, starting from the center of the rotor 1, goes up to the extremity of this strap 11 then comes back after having formed said loop 71. This loop 71 may be formed by the end of the bundle 20 over a cylindrical bush. Such a loop 71 offers a very simple connecting mode having great strength, since the fibers of the bundle 20 are not interrupted. The advantage of this embodiment is that it permits individual removal of each blade, which can be advantageous if a blade, damaged in service by a foreign body, has to be replaced rapidly and economically.

I claim:

1. A multi-blade rotor (1) especially for a helicopter rear anti-couple propeller, comprising a hub body (3) to which are radially connected twistable blade retention blades (11 to 17), equal in number to the number of straps, each formed by two bundles (20) of high-mechanical-strength fibers agglomerated by a hardened synthetic resin, each of the said bundles having a flattened cross section and forming at least two halves of different straps, wherein each of the bundles (20) is twisted and curved in the region of its passage in proximity to the circular central area of the hub body (3) in such a way as to be tangential to the circumference of the said central area of the hub along the greater dimension of its cross section.

2. The rotor (1) as claimed in claim 1, wherein each bundle (20) of a strap (11) passes, in the region of the hub body (3), above another first bundle (20) and below another second bundle (20).

3. The rotor (1) as claimed in claim 2, wherein said other first and second bundles (20) belong to the same strap (11 to 17).

4. The rotor (1) as claimed in claim 1 wherein the cross sections of the various bundles (20) are oriented along the same angle with respect to the plane of rotation of the straps (11 to 17) about the shaft (32) of the rotor (1).

5. The rotor as claimed in claim 1 wherein the angular setting of the straps (11 to 17) relative to the plane of rotation of said rotor outside the hub body (3) is established by grooves (30) in the peripheral part of said hub body (3) through which said straps pass, said grooves being inclined relative to said plane.

6. The rotor (1) as claimed in claim 1 wherein the two bundles (20) of fibers constituting each strap (11 to 17) are placed side by side outside said hub body (3).

7. The rotor (1) as claimed in claim 1 wherein at least one of said straps (11) constitutes a spar for the aerodynamically shaped part of the corresponding blade (41).

8. The rotor (1) as claimed in claim 1 wherein at least one of said straps (11) comprises, at its extremity, a loop (71) making it possible to connect a blade (41) thereto.

* * * * *